(12) United States Patent
Smith

(10) Patent No.: US 6,288,779 B1
(45) Date of Patent: Sep. 11, 2001

(54) CLOSE-UP IMAGING DEVICE USING A CMOS PHOTOSENSITIVE ELEMENT

(75) Inventor: Ronald D. Smith, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/275,472

(22) Filed: Mar. 24, 1999

(51) Int. Cl.[7] .................................................. G06K 9/20
(52) U.S. Cl. ........................ 356/71; 250/216; 348/63; 382/124
(58) Field of Search ........................ 356/71; 250/216; 348/62, 63; 382/124, 127

(56) References Cited

U.S. PATENT DOCUMENTS 5,974,162 * 10/1999 Metz et al. .......................... 382/124
6,115,482 * 9/2000 Sears et al. .......................... 382/114

* cited by examiner

Primary Examiner—F. L Evans
(74) Attorney, Agent, or Firm—Trop, Pruner & Hu, P.C.

(57) ABSTRACT

A close-up imaging device may take advantage of the pinhole effect that may be achieved with complementary metal oxide semiconductor imaging arrays. In particular, a high magnification optical lens may be placed at a distance from the imaging array which is less than the focal length of the device. In this way, a relatively compact, low cost imaging device may be used for close-up imaging applications such as fingerprint scanning or text reading.

18 Claims, 3 Drawing Sheets

CLOSE-UP IMAGING DEVICE USING A CMOS PHOTOSENSITIVE ELEMENT

BACKGROUND

This invention relates generally to digital imaging devices and particularly to the use of complementary metal oxide semiconductor (CMOS) photosensitive elements.

Digital imaging devices commonly utilize charge coupled device (CCD) imagers or complementary metal oxide semiconductor (CMOS) imaging arrays. CMOS imaging arrays, while currently having lower resolution than the CCD arrays, have the advantage that they may be formed by conventional integrated circuit manufacturing processes. As a result, they may be integrated with logic and memory which may enable the devices to not only capture an image but also to analyze and operate on the captured image all in one integrated circuit. This may result in a more compact design at lower cost.

Generally CMOS imaging arrays are utilized in digital cameras. The digital cameras may take a relatively high resolution picture and this picture may be transferred and stored in a tethered computer system.

CCD based cameras are also very popular. In addition CCD-based sensors are also used in various close-up applications such as fingerprint identification. In fingerprint identification, an image of the user's fingerprint is taken. That image may be stored in a database or it may be used for user identification. That is, the image of the user's fingerprint may be compared to a stored list of authorized users. Once the user is identified by his or her fingerprint, the user may be allowed access to a computer system or otherwise allowed access to a limited access control point.

Similarly, text readers may be utilized to image a text array and either store the text information for later analysis or magnify the text for viewing by those having limited vision. Conventionally, the imaged text is analyzed and stored in separate integrated circuit chips because conventionally CCD sensors are utilized.

There is a continuing need for lower cost or more compact imaging devices for close-up imaging applications.

SUMMARY

An imaging device includes a complementary metal oxide semiconductor photosensitive element. An image forming optical device is spaced from the element by a distance less than the focal length of the optical device.

DETAIL DESCRIPTION

Figure 1:
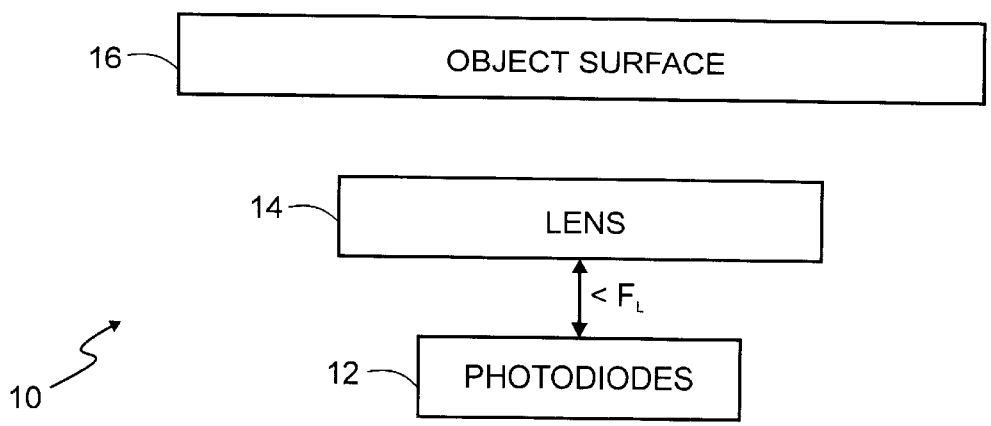
FIG. 1 is a schematic depiction of one embodiment of the present invention.

A close-up imaging device 10, shown in FIG. 1, may include a photosensitive imaging array 12, an image forming optical device 14, and an object surface 16. The photosensitive imaging array 12 may be implemented by photodiodes in one embodiment of the present invention and, in particular, by complementary metal oxide semiconductor (CMOS) imaging arrays. CMOS imaging arrays are advantageous in close-up applications because they create a natural pinhole camera effect due to the way they are manufactured.

The optical device 14 may be any of a variety of diffractive or Fresnel lenses. Advantageously the device 14 is formed in a flat shape to create a compact overall design. The device 14, in some embodiments of the present invention, may be capable of forming an image and of magnifying that image. In some embodiments it may be desirable to use a relatively high magnification lens system as the optical device 14.

The object surface 16 may receive an object to be imaged through the surface 16. For example, a user's thumbprint or a page of text to be read may contact the upper side of the surface 16 to be imaged by the array 12.

In one embodiment of the present invention, the distance between the optical device 14 and the photosensitive imaging array 12 is less than the focal length ($F_L$) of the optical device. The combination of the optical device, positioned at a distance less than the focal length, together with an effective pinhole effect arising from the use of a CMOS photosensitive imaging array 12 creates a relatively compact imaging device which is capable of forming adequate images of close-up objects for purposes of storage, identification or further analysis. These images may be black and white or, if preferred, they may be in color.

Figure 2:
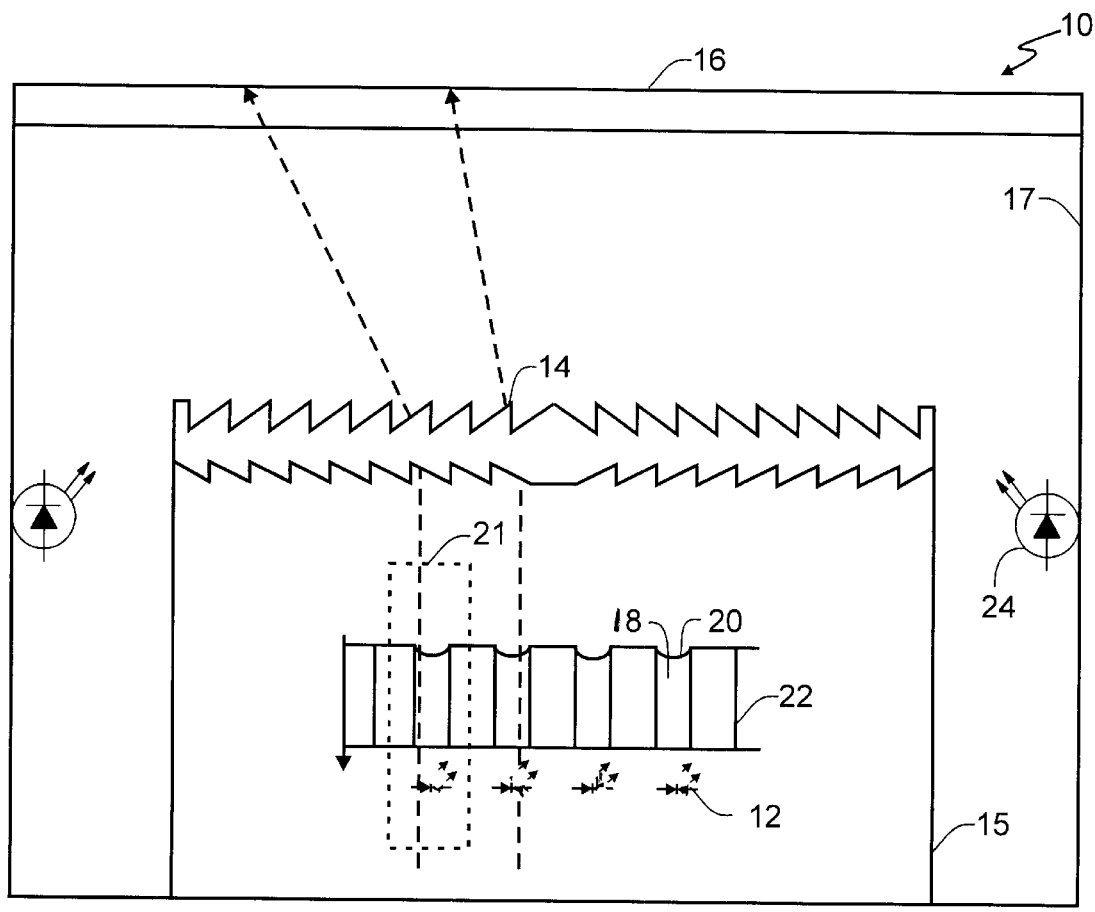
FIG. 2 is an enlarged cross-sectional view of one implementation of the conceptualized embodiment shown in FIG. 1.

A more detailed embodiment of the present invention is shown in FIG. 2 which includes the photosensitive imaging array 12 and an optical device 14, illustrated as a Fresnel lens, both contained in a housing 15. The object surface 16 is illustrated as a transparent glass which in some embodiments of the present invention may be formed from frosted glass. A plurality of light sources 24 may be arranged within a housing 17 that supports the surface 16 and around the housing 15 that supports the optical device 14. The light sources 24 may be light emitting diodes (LEDs) which illuminate the surface of an object placed on the object surface 16.

The photosensitive imaging array 12 includes a plurality of photodiodes situated under highly telecentric pixels 21 indicated in dotted lines in FIG. 2. Each pixel 21 is formed of a conformal lenticular coating which may in some embodiments may form a color filter array (CFA) 18. The upper surface of the array 18 forms a natural lenticular shape as indicated at 20. In addition, the interlayer dielectric (ILD) and metal lines indicated at 22, contribute to the pixel's highly telecentric shape.

Thus, the photodiodes look out through an elongate passage defined by the CFA 18. The effect is to create a refined pinhole camera effect. While normally this arrangement reduces the acceptance angle of the sensor and for most applications makes the sensor less desirable, in embodiments of the present invention, an improved sensor for close-up applications is achieved.

The reduction in acceptance angle effectively increases the F number of the lens system. Increasing the F number reduces the amount of light and therefore the sensitivity of the system. But it also increases the depth of field or focus. At the limit, increasing the F number yields an effective pinhole camera.

Thus, with the CMOS sensor, the pinhole aperture is effectively formed at the sensor itself and so the optics do not have to use a separate aperture to increase the F number. As a result, a high magnification lens may be effectively placed "too close" to the sensor, resulting in a relatively low cost, compact close-up imaging device.

The optical device 14 forms a magnified, upright image on the imaging array 12. The device is positioned at a distance less than its focal length from the imaging array.

The object surface 16 may be formed of frosted glass in some embodiments, to increase the contrast of the image. For example, when imaging the ridges on a user's fingerprint for fingerprint analysis, the ridges on the finger, being in intimate contact with the frosted glass, reflect light from the LEDs 24 while the valleys between the ridges appear dark because their image is diffused.

The spectral sensitivity of the CMOS sensor may be tuned to the lower end of the visible spectrum so that it maps well with commonly available LEDs. The sensor's IR sensitivity may also be used to help validate that the object being imaged is in fact warm blooded and not a rubber cast of someone's finger.

Figure 3:
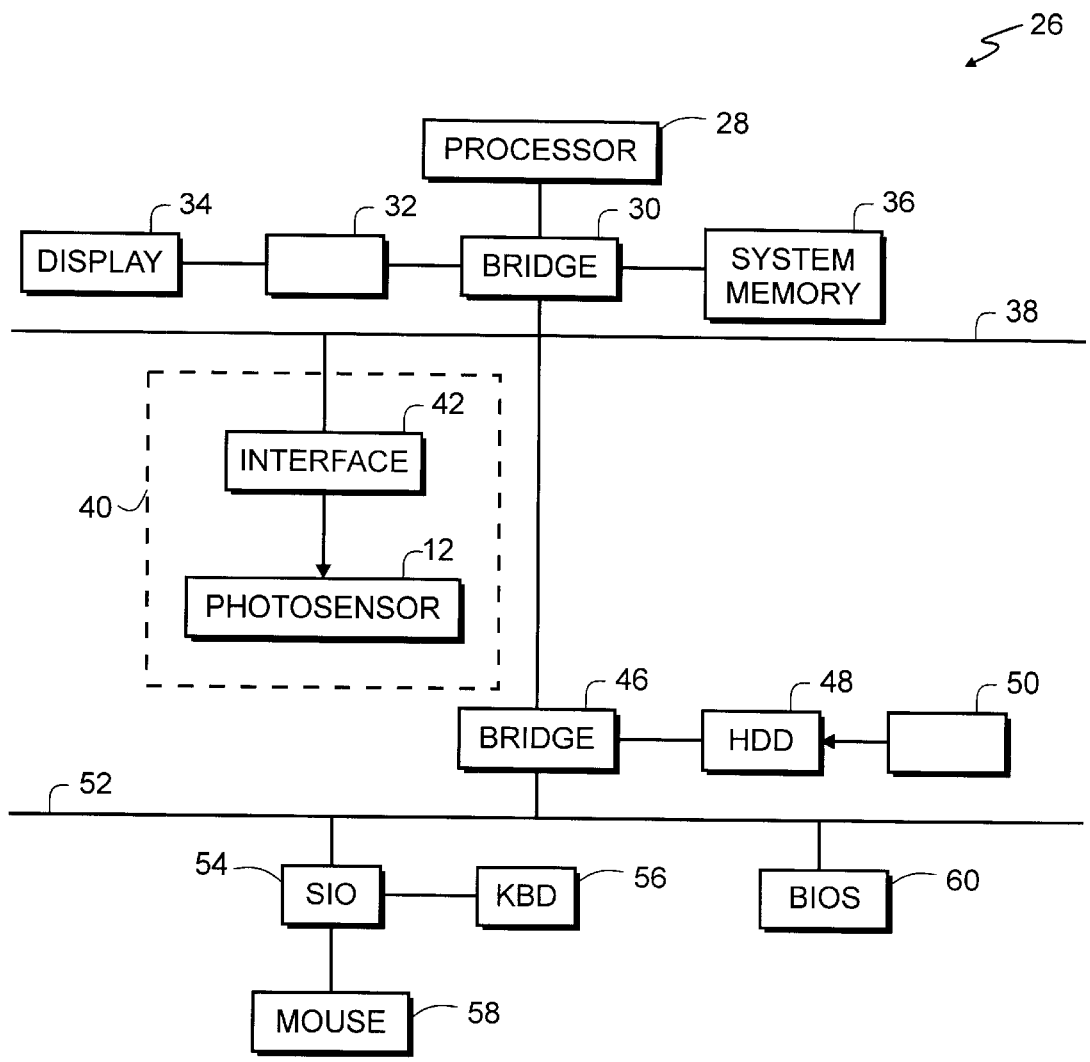
FIG. 3 is a block diagram for implementing an embodiment such as that shown in FIGS. 1 or 2.
Figure 5:
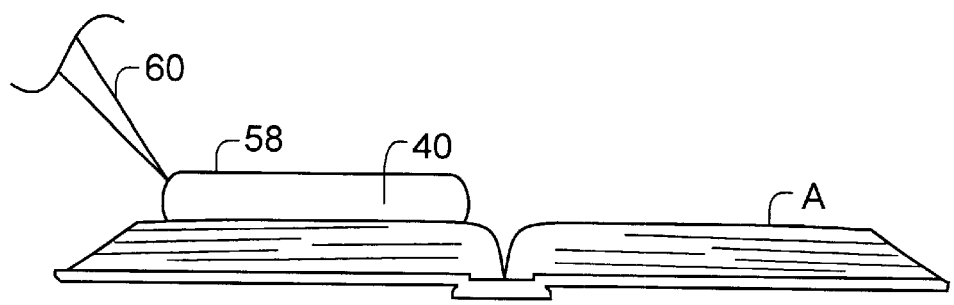
FIG. 5 is a side elevation view of one embodiment of the present invention utilized as a text reader.

One implementation of the present invention, shown in FIG. 3, includes a processor-based system 26 having a processor 28 coupled to a bridge 30. The bridge 30 is coupled between system memory 36 and graphics accelerator 32. A display 34 may be coupled to the graphics accelerator.

The bridge 30 also couples a bus 38 in turn coupled to a CMOS close-up imaging sensor 40. The sensor may have integrated with it an interface 42 together with the photosensitive imaging array 12. The interface may itself include a processor 42 for conducting analyses on the images detected by the array 12. Alternatively, as shown in FIG. 3, the interface 42 may simply interface the photosensitive imaging array with the processor 28.

In one embodiment, a second bridge 46 couples a hard disk drive 48 which may contain software 50 for implementing specific embodiments of the close-up imaging device such as a fingerprint identification system or a text reader.

The bridge 46 is also coupled to another bus 52 which couples the conventional devices such as a keyboard 56 and a mouse 58 through a serial input/output (SIO) 54. A binary input/output system (BIOS) 60 may also be coupled to the bus 52.

Figure 4:
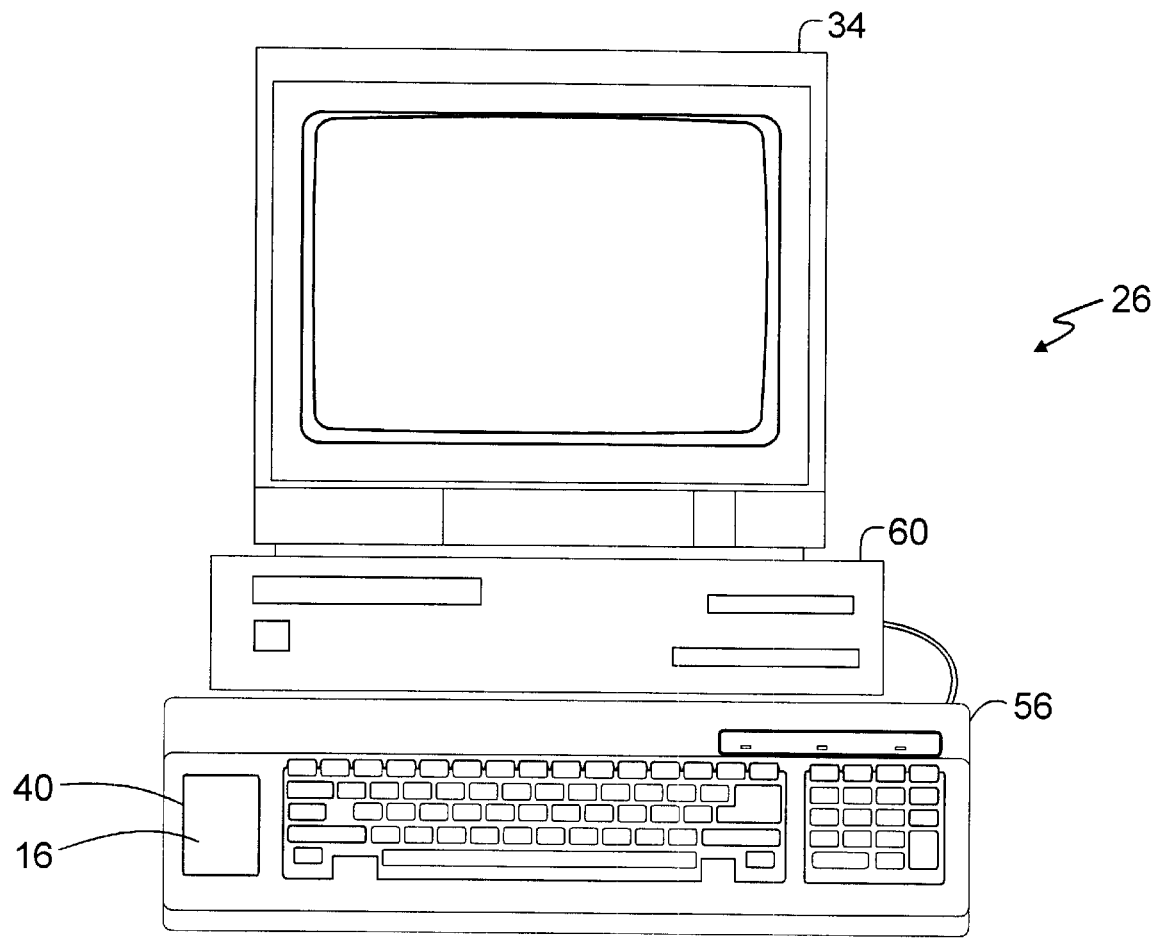
FIG. 4 is a side elevational view of one embodiment of the present invention implemented in a computer system.

As shown in FIG. 4, the system may provide a compact, low cost fingerprint identification system. In this case, the close-up CMOS imaging system is integrated into a keyboard 56. The keyboard 56 is in turn coupled to a display 34 and a housing 60 containing the components 26. Access to the system may be controlled through the close-up imaging sensor 40. Namely, the user may place his or her thumb on the glass 16. An image is taken and analyzed to determine if the user is one of the authorized users of the system only if the user's fingerprint matches the database of authorized users is access permitted. Conventional fingerprint analysis software may be utilized to compare the ridges in the proposed user's finger with ridge patterns stored for authorized users. Because the system is relatively compact, it may be integrated into a relatively thin keyboard, in one embodiment, thereby minimizing size without increasing cost.

Similarly, the close-up imaging sensor 40 may also be provided in a housing 58 which may be conveniently held in a user's hand. The housing 58 may then be scanned over pages of text to provide scanned images for analysis by the system 26. Again the sensor 40 may be made in a relatively low cost form and sufficiently compact that it may be relatively easily held in the user's hand. This simplifies the scanning or text reading operation. The text reader may be utilized for hand scanning or it may be used by those with limited vision to record and enlarge the page of text for viewing on the display 34.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An imaging system comprising:
   a complementary metal oxide semiconductor photosensitive element; and
   an image forming optical device spaced from said element by a distance less than the focal length of said optical device.

2. The system of claim 1 wherein said image forming optical device is a flat lens system.

3. The system of claim 2 wherein said flat lens system is a Fresnel lens.

4. The system of claim 1 wherein said photosensitive element approximates a pinhole camera effect.

5. The system of claim 1 including a plurality of light emitting elements for illuminating an object to be imaged.

6. The system of claim 1 including a first housing supporting said device and element, said system further including a second housing containing an object surface.

7. The system of claim 1 wherein said element is sensitive to infrared radiation.

8. The system of claim 1 adapted to identify fingerprints.

9. The system of claim 1 adapted to read text.

10. A method of imaging comprising:
    magnifying the image of an object using an optical device; and
    receiving the image on a complementary metal oxide semiconductor photosensitive element, spaced from said optical device by a distance less than the focal length of said optical device.

11. The method of claim 10 wherein receiving an image includes creating a pinhole effect using said photosensitive element.

12. The method of claim 10 further including scanning pages of text.

13. The method of claim 10 further including imaging a fingerprint.

14. A processor-based system for close-up imaging comprising:
    a processor;
    a memory coupled to said processor; and
    an imaging device coupled to said processor, said device including a complementary metal oxide semiconductor photosensitive element and an image forming optical device spaced from said element by a distance less than the focal length of said optical device.

15. The system of claim 14 including a database stored in said memory, containing information about the fingerprints of authorized users of said system.

16. The system of claim 15 including a keyboard coupled to said processor, said device being formed in said keyboard.

17. The system of claim 14 wherein said device is contained in a handheld housing.

18. The system of claim 14 wherein said element includes a conformal coating over said element creating a lenticular surface.

* * * * *

UNITED STATES PATENT AND TRADEMARK OFFICE
CERTIFICATE OF CORRECTION

PATENT NO. : 6,288,779 B1
DATED : September 11, 2001
INVENTOR(S) : Ronald D. Smith It is certified that error appears in the above-identified patent and that said Letters Patent is hereby corrected as shown below:

<u>Column 4,</u>
Line 66, please insert the following two claims:
-- 19.  The system of claim 14 adapted to detect temperature information about an object proximate to said device. --
-- 20.  The system of claim 14 wherein said optical device is a flat lens. --

Signed and Sealed this

Sixteenth Day of July, 2002

*Attest:*

*Attesting Officer*

JAMES E. ROGAN
*Director of the United States Patent and Trademark Office*